United States Patent
Zhang

(10) Patent No.: US 12,165,640 B2
(45) Date of Patent: Dec. 10, 2024

(54) RESPONSE METHOD, TERMINAL, AND STORAGE MEDIUM FOR SPEECH RESPONSE

(71) Applicants: BEIJING WODONG TIANJUN INFORMATION TECHNOLOGY CO., LTD., Beijing (CN); BEIJING JINGDONG CENTURY TRADING CO., LTD., Beijing (CN)

(72) Inventor: Wentao Zhang, Beijing (CN)

(73) Assignees: BEIJING WODONG TIANJUN INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 272 days.

(21) Appl. No.: 17/775,406

(22) PCT Filed: Aug. 25, 2020

(86) PCT No.: PCT/CN2020/111150
§ 371 (c)(1),
(2) Date: May 9, 2022

(87) PCT Pub. No.: WO2021/098318
PCT Pub. Date: May 27, 2021

(65) Prior Publication Data
US 2022/0399013 A1    Dec. 15, 2022

(30) Foreign Application Priority Data
Nov. 21, 2019    (CN) .......................... 201911147594.8

(51) Int. Cl.
*G10L 15/22*    (2006.01)
*G06F 40/30*    (2020.01)
(Continued)

(52) U.S. Cl.
CPC .............. *G10L 15/22* (2013.01); *G06F 40/30* (2020.01); *G10L 13/02* (2013.01); *G10L 15/1815* (2013.01); *G10L 15/197* (2013.01)

(58) Field of Classification Search
None
See application file for complete search history.

(56) References Cited

U.S. PATENT DOCUMENTS

| | | | |
|---|---|---|---|
| 2012/0016678 | A1 | 1/2012 | Gruber |
| 2012/0245944 | A1 | 9/2012 | Gruber |

(Continued)

FOREIGN PATENT DOCUMENTS

| | | | |
|---|---|---|---|
| CN | 106301670 | A | 1/2017 |
| CN | 106649694 | A | 5/2017 |

(Continued)

OTHER PUBLICATIONS

Supplementary European Search Report in the European application No. 20890060.5, mailed on Nov. 24, 2022, 8 pgs.

(Continued)

*Primary Examiner* — Antim G Shah
(74) *Attorney, Agent, or Firm* — Cooper Legal Group, LLC

(57) ABSTRACT

A response method, a terminal, and a storage medium. The response method comprises: determining, at a first time point by means of speech recognition processing, a first target text corresponding to the first time point (1001); determining, according to the first target text, a first predicted intention and an answer to be pushed, wherein said answer is used for responding to speech information (1002); continuing to determine, by means of the speech recognition processing, a second target text corresponding to a second time point and a second predicted intention, wherein the second time point is the next successive time point of the (Continued)

first time point (1003); determining, according to the first predicted intention and the second predicted intention, whether a preset response condition is satisfied (1004); and responding according to said answer if the preset response condition is determined to be satisfied (1005).

14 Claims, 8 Drawing Sheets

(51) Int. Cl.
*G10L 13/02* (2013.01)
*G10L 15/18* (2013.01)
*G10L 15/197* (2013.01)

(56) References Cited

U.S. PATENT DOCUMENTS

| | | |
|---|---|---|
| 2013/0110505 A1 | 5/2013 | Gruber et al. |
| 2013/0110515 A1 | 5/2013 | Guzzoni et al. |
| 2013/0110518 A1 | 5/2013 | Gruber et al. |
| 2013/0110519 A1 | 5/2013 | Cheyer et al. |
| 2013/0110520 A1 | 5/2013 | Cheyer et al. |
| 2013/0111348 A1 | 5/2013 | Gruber et al. |
| 2013/0111487 A1 | 5/2013 | Cheyer et al. |
| 2013/0117022 A1 | 5/2013 | Chen et al. |
| 2013/0185074 A1 | 7/2013 | Gruber et al. |
| 2013/0185081 A1 | 7/2013 | Cheyer et al. |
| 2017/0178626 A1 | 6/2017 | Gruber et al. |
| 2018/0096681 A1 | 4/2018 | Ni et al. |
| 2019/0066668 A1 | 2/2019 | Lin et al. |
| 2019/0096406 A1 | 3/2019 | Ni et al. |
| 2019/0206397 A1* | 7/2019 | Zhou .................. G10L 13/08 |
| 2019/0260518 A1 | 8/2019 | Xun |
| 2020/0035244 A1* | 1/2020 | Kim .................. G06F 40/58 |
| 2020/0279556 A1 | 9/2020 | Gruber et al. |
| 2022/0254338 A1 | 8/2022 | Gruber et al. |

FOREIGN PATENT DOCUMENTS

| | | |
|---|---|---|
| CN | 107146610 A | 9/2017 |
| CN | 107590120 A | 1/2018 |
| CN | 108257616 A | 7/2018 |
| CN | 108347789 A | 7/2018 |
| CN | 109410948 A | 3/2019 |
| CN | 109586878 A | 4/2019 |
| CN | 109670020 A | 4/2019 |
| CN | 110012557 A | 7/2019 |
| CN | 110046221 A | 7/2019 |
| CN | 110060663 A | 7/2019 |
| CN | 110169119 A | 8/2019 |
| CN | 110177358 A | 8/2019 |
| EP | 3916723 A1 | 12/2021 |
| JP | 2015004928 A | 1/2015 |
| JP | 2019144348 A | 8/2019 |
| WO | 2011088053 A2 | 7/2011 |
| WO | 2019040167 A1 | 2/2019 |

OTHER PUBLICATIONS

International Search Report in the international application No. PCT/CN2020/111150, mailed on Nov. 27, 2020, 3 pgs.
English translation of the Written Opinion of the International Search Authority in the international application No. PCT/CN2020/111150, mailed on Nov. 27, 2020, 3 pgs.

\* cited by examiner

RESPONSE METHOD, TERMINAL, AND STORAGE MEDIUM FOR SPEECH RESPONSE

CROSS-REFERENCE TO RELATED APPLICATION

The present application is filed based upon and claims priority to Chinese Patent Application No. 201911147594.8, filed on Nov. 21, 2019, the disclosure of which is hereby incorporated by reference in its entirety.

TECHNICAL FIELD

The disclosure relates to the technical field of terminals, and particularly to a response method, a terminal, and a storage medium.

BACKGROUND

With the rapid development of mobile Internet, Automatic Speech Recognition (ASR) and related technologies thereof have become one of the most natural and efficient man-machine interaction means, and have been applied extensively to speech dialing, speech navigation, smart home control, speech search, dictation data entry, and other scenarios. ASR refers to a process of obtaining useful information from audio data and recognizing the audio data by use of a related technology to convert the audio data into text information.

In practical applications, when ASR is performed on an audio signal input with a great length, processes including ASR, intention recognition, answer assembly, and the like are usually performed only after a user finishes speaking, and then responding is performed according to an assembled answer, so the responding efficiency is affected seriously. Moreover, during intention recognition, single intention recognition brings the defect of loss of a user intention, which reduces the responding accuracy.

SUMMARY

Embodiments of the disclosure provide a response method, a terminal, and a storage medium. Not only is the responding efficiency improved, but also the defect of intention loss is overcome, the responding accuracy is further improved, and the terminal is smarter.

The technical solutions of the embodiments of the disclosure are implemented as follows.

According to a first aspect, an embodiment of the disclosure provides a response method, which includes the following operations.

A first target text corresponding to a first moment is determined at the first moment by means of ASR processing.

A first predicted intention and an answer to be pushed are determined according to the first target text. The answer to be pushed is used for responding to speech information.

A second target text corresponding to a second moment and a second predicted intention are determined by means of ASR processing, the second moment being a next successive moment of the first moment.

Whether a preset response condition is satisfied is determined according to the first predicted intention and the second predicted intention.

Responding is performed with the answer to be pushed in response to determining that the preset response condition is satisfied.

According to a second aspect, an embodiment of the disclosure provides a terminal, which includes a determination portion, a judgment portion, and a processing portion.

The determination portion is configured to determine, at a first moment, a first target text corresponding to the first moment by means of ASR processing.

The determination portion is further configured to determine a first predicted intention and an answer to be pushed according to the first target text. The answer to be pushed is used for responding to speech information.

The determination portion is further configured to determine a second target text corresponding to a second moment and a second predicted intention by means of ASR processing, the second moment being a next successive moment of the first moment.

The judgment portion is configured to determine whether a preset response condition is satisfied according to the first predicted intention and the second predicted intention.

The processing portion is configured to respond with the answer to be pushed in response to determining that the preset response condition is satisfied.

According to a third aspect, an embodiment of the disclosure provides a terminal, which includes a processor and a memory storing an instruction executable by the processor. The instruction is executed by the processor to implement the response method as described above.

According to a fourth aspect, an embodiment of the disclosure provides a computer-readable storage medium having stored thereon a program applied to a terminal. The program is executed by a processor to implement the response method as described above.

The embodiments of the disclosure provide a response method, a terminal, and a storage medium. The terminal determines, at the first moment, the first target text corresponding to the first moment by means of ASR processing, determines the first predicted intention and the answer to be pushed according to the first target text, the answer to be pushed being used for responding to speech information, continues to determine the second target text corresponding to the second moment and the second predicted intention by means of ASR processing, the second moment being a next successive moment of the first moment, determines whether the preset response condition is satisfied according to the first predicted intention and the second predicted intention, and responds with the answer to be pushed in response to determining that the preset response condition is satisfied. That is, in the embodiments of the disclosure, the terminal performs continuous intention prediction on input speech information by means of real-time ASR processing, assembles an answer in advance, stores the answer temporarily, and pushes the answer in response to determining that the preset response condition is satisfied presently, so as to implement responding. Not only is the responding efficiency improved, but also the defect of intention loss is overcome, the responding accuracy is further improved, and the terminal is smarter.

DETAILED DESCRIPTION

Figure 1:
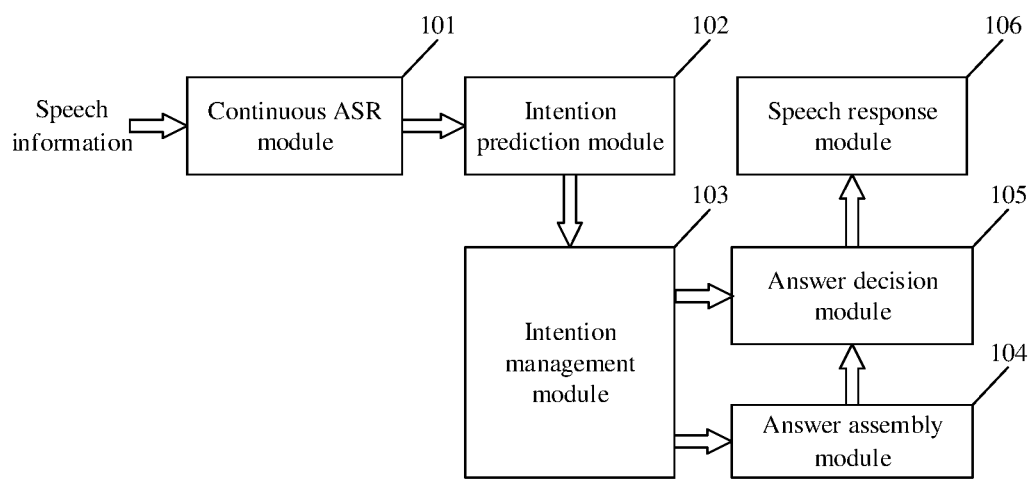
FIG. 1 is a structure diagram of a speech response system according to an embodiment of the disclosure.

The technical solutions in the embodiments of the disclosure will be described clearly and completely below in combination with the drawings in the embodiments of the disclosure. It can be understood that specific embodiments described herein are only used for explaining the related disclosure rather than limiting the disclosure. In addition, it is also to be noted that, for ease of description, only parts related to the disclosure are shown in the drawings.

With the rapid development of mobile Internet, ASR and related technologies thereof have become one of the most natural and efficient man-machine interaction means, and have been applied extensively to speech dialing, speech navigation, smart home control, speech search, dictation data entry, and other scenarios. ASR refers to a process of obtaining useful information from audio data and recognizing the audio data by use of a related technology to convert the audio data into text information, i.e., a high technology of converting a speech signal into a corresponding text or command by a machine through recognition and understanding processes, like human ears and mouth.

As a technology of generating an artificial speech mechanically and electronically, Text-To-Speech (TTS) converts text information generated by a computer or input externally into an understandable and fluent spoken Chinese output, like a human mouth. Furthermore, TTS and ASR are two key technologies necessary to the implementation of man-machine speech communication and the establishment of a spoken dialog system capable of listening and speaking.

A response system is a system configured to implement a man-machine spoken dialog, and a front end thereof is a speech recognizer. ASR processing is performed on input speech information to convert the speech information into a corresponding text. Then, a Natural Language Understanding (NLU) technology is used to perform entity recognition and intention recognition. Intention comparison, inheriting, fusion, and other solutions are performed to obtain an only intention with a highest score. An answer is assembled according to the intention with the highest score. Furthermore, TTS processing is performed on the assembled answer to convert text information into a voice (for reading aloud) to further implement speech responding.

In practical applications, users have increasing requirements on a response speed of the system. However, a response mechanism in the related art usually performs ASR processing only after a user finishes speaking, namely after a speech input end marker is recognized, and performs intention recognition, answer assembly, and other processes according to an obtained recognition result. As a result, there is a strict starting time point (after the user finishes speaking) for answer assembly, which affects the responding efficiency seriously, and the defect of low responding efficiency is more obvious when ASR is performed on a speech signal with a great length. In addition, when intention recognition is performed on the speech signal with a great length, the response mechanism in the related art may consider speech input information as a complete sentence, and reserve only one intention. Since the speech signal with a great length includes more than one intention, single intention recognition may bring the defect of user intention loss and reduce the responding accuracy.

The embodiments of the disclosure provide a response method. A terminal performs continuous intention prediction on input speech information by means of real-time ASR processing, assembles answer in advance and stores the answer temporarily, and pushes the answer in response to determining that a preset response condition is satisfied presently, so as to implement responding. Not only the responding efficiency is improved, but also the defect of intention loss is overcome, the responding accuracy is further improved, and the terminal is smarter.

The technical solutions in the embodiments of the disclosure will be described clearly and completely below in combination with the drawings in the embodiments of the disclosure.

An embodiment of the disclosure provides a response method, which is applicable to a terminal. The terminal is provided with a speech response system. FIG. 1 is a structure diagram of a speech response system according to an embodiment of the disclosure. As shown in FIG. 1, the speech response system 100 includes a continuous ASR module 101, an intention prediction module 102, an intention management module 103, an answer assembly module 104, an answer decision module 105, and a speech response module 106. The continuous ASR module 101 is configured to convert input speech information into corresponding text information in real time. The intention prediction module 102 and the intention management module 103 are configured to predict an intention and decide whether the predicted intention is correct, respectively. The answer assembly module 104 is configured to assemble an answer according to the intention predicted by the intention prediction module to further obtain an answer to be pushed. The answer decision module 105 is configured to store the answer to be pushed temporarily, receive a decision result of the intention management module about the predicted intention, and further send or discard the answer to be pushed according to the decision result of the intention management module about the predicted intention. The speech response module 106 is configured to convert text information corresponding to the answer to be pushed into speech information.

Figure 2:
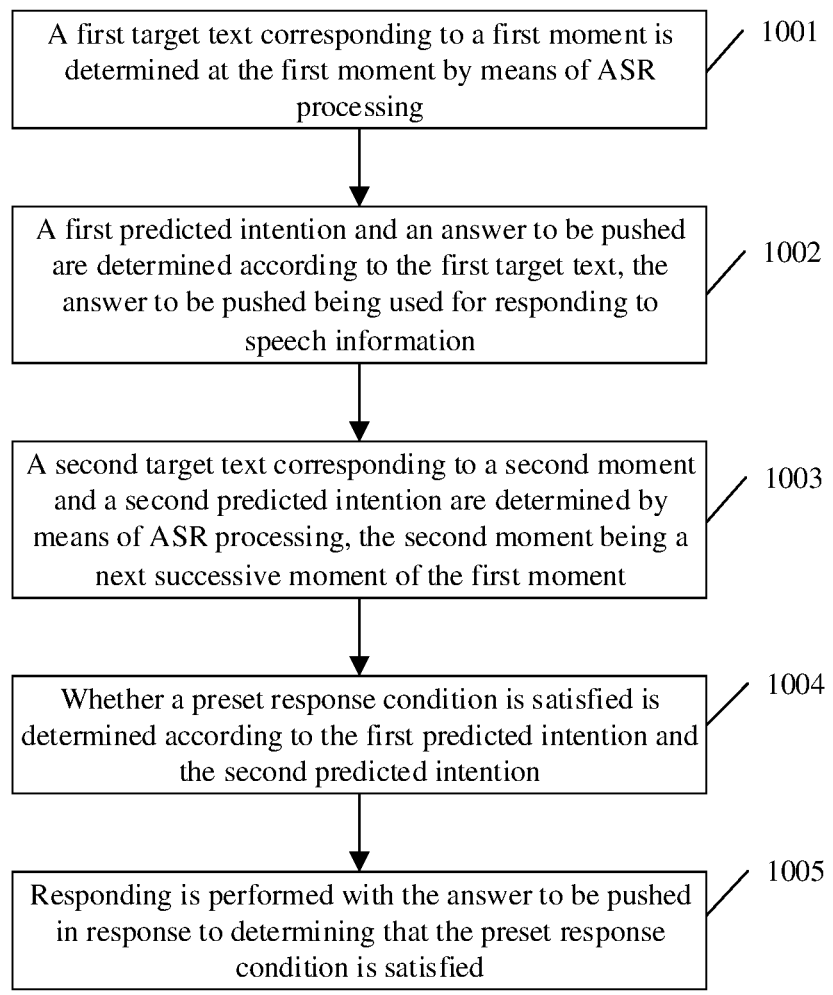
FIG. 2 is a first implementation flowchart of a response method according to an embodiment of the disclosure.

FIG. 2 is a first implementation flowchart of a response method according to an embodiment of the disclosure. As shown in FIG. 2, the response method for the terminal in the embodiment of the disclosure includes the following operations.

In 1001, a first target text corresponding to a first moment is determined at the first moment by means of ASR processing.

In the embodiment of the disclosure, the terminal may determine, at a first moment, a first target text corresponding to the first moment by means of ASR processing.

It is to be noted that, in the embodiment of the disclosure, the terminal may be any device having communication and storage functions and provided with a speech response system, e.g., a tablet computer, a mobile phone, a smart speaker, a smart television, a smart air purifier, a smart air conditioner, an electronic book reader, a Moving Picture Experts Group Audio Layer III (MP3) player, and a Moving Picture Experts Group Audio Layer IV (MP4) player.

It is to be noted that, in the embodiment of the disclosure, the terminal determines, at the first moment, the first target text according to speech information obtained at the first moment. Specifically, the terminal obtains first speech information corresponding to the first moment, and performs ASR processing on the first speech information using the continuous ASR module, to convert the first speech information into the first target text, so as to further determine the first target text corresponding to the first moment. The first speech information obtained by the terminal may be collected by the terminal through an audio collection component. Alternatively, the first speech information is collected and sent to the terminal by another device through an audio collection component, and the another device is an electronic device independent of the terminal.

It is to be noted that, in the embodiment of the disclosure, the continuous ASR module performs ASR processing on the first speech information based on an "Acoustic Model (AM)" and a "Language Model (LM)", thereby determining the first target text corresponding to the first speech information. The AM is obtained by training with speech data, and uses a feature vector as an input and phoneme information as an output. The LM is obtained by training with a large amount of text information, and outputs a probability of association between characters or words.

Specifically, the obtained first speech information corresponding to the first moment is preprocessed first to extract feature information of a speech. Then, phoneme information corresponding to the feature information, i.e., phoneme information corresponding to the first speech information, is determined through the "AM". All characters or words corresponding to the phoneme information continue to be found in a "dictionary", and a probability of association between the characters or words corresponding to the phoneme information is obtained through the "LM". A best target text corresponding to the first speech information, i.e., the first target text, is further determined by "decoding".

It is to be noted that, in the embodiment of the disclosure, the terminal implements continuous ASR processing through the continuous ASR module without searching for an end marker of a sentence and considering the whole speech as one sentence. Specifically, the terminal collects speech information in real time, and converts the obtained speech information into a target text using the continuous ASR module. Correspondingly, the terminal collects, at each moment T, speech information corresponding to the moment, and may obtain a specific output, i.e., a target text corresponding to the speech information collected at the moment, through the continuous ASR module. For example, first speech information is collected at a moment T1, and the continuous ASR module obtains, based on the AM, that phoneme information corresponding to the first speech information is " /maɪ/ /ɔːrdə(r)/ ", and further determines, based on the LM, that a first target text corresponding to the first speech information at the moment T1 is "my order".

Furthermore, in the embodiment of the disclosure, after determining the first target text corresponding to the first moment, the terminal may further determine an intention corresponding to the speech information collected at the first moment and an answer to be pushed according to the determined first target text.

In 1002, a first predicted intention and an answer to be pushed are determined according to the first target text. The answer to be pushed is used for responding to the speech information.

In the embodiment of the disclosure, after determining the first target text corresponding to the first moment, the terminal may determine the first predicted intention and the answer to be pushed according to the first target text. The answer to be pushed is used for responding to the speech information.

It is to be noted that, in the embodiment of the disclosure, after determining the first target text corresponding to the first moment, the terminal may perform intention prediction on the determined first target text using the intention prediction module. That is, before a user finishes speaking, the terminal may predict a question to be asked by the user according to the obtained first target text, thereby determining the first predicted intention, and stores the first predicted intention in the intention management module. The answer assembly module assembles an answer in advance according to the determined first predicted intention, to obtain a first answer corresponding to the first predicted intention, and stores the first answer in the answer decision module as the answer to be pushed.

Exemplarily, when the first target text determined by the user at the first moment is "my order", it is predicted that a user input may be "where is my order", and it may further be determined that the first predicted intention of the user is "logistics query". The answer is assembled in advance according to the determined first predicted intention, to obtain the first answer as "logistics information", and the "logistics information" is further stored temporarily as the answer to be pushed.

Furthermore, in the embodiment of the disclosure, after the first predicted intention and the answer to be pushed are determined according to the first target text, a target text corresponding to a next successive moment of the first moment and a predicted intention may continue to be determined by means of the real-time ASR processing.

In 1003, a second target text corresponding to a second moment and a second predicted intention continue to be determined by means of the ASR processing. The second moment is a next successive moment of the first moment.

In the embodiment of the disclosure, after determining the first predicted intention according to the first target text, the terminal continues to perform ASR processing to further determine the second target text corresponding to the successive second moment after the first moment and the second predicted intention.

It is to be noted that, in the embodiment of the disclosure, after determining the first predicted intention corresponding to the first target text and the answer to be pushed by performing the real-time ASR processing, the terminal continues to perform the ASR processing through the ASR module to obtain the speech information corresponding to a next successive moment of the first moment, and determines a target text corresponding to the next moment, i.e., the second target text, according to the speech information. The intention prediction module determines the second predicted intention corresponding to the second target text according to the second target text.

It is to be noted that, in the embodiment of the disclosure, the second target text is a real-time recognition integration result of the first target text corresponding to the first moment and a real-time text corresponding to the second moment. Specifically, the continuous ASR module may perform, at each moment, real-time recognition integration on a target text corresponding to a previous moment and a real-time text corresponding to the present moment, and determine the real-time recognition integration result as the target text corresponding to the present moment. That is, the real-time recognition integration is performed on the first target text corresponding to the first moment and the real-time text corresponding to the second moment to determine the second target text corresponding to the second moment. The intention prediction module determines the second predicted intention according to the second target text.

Figure 3:
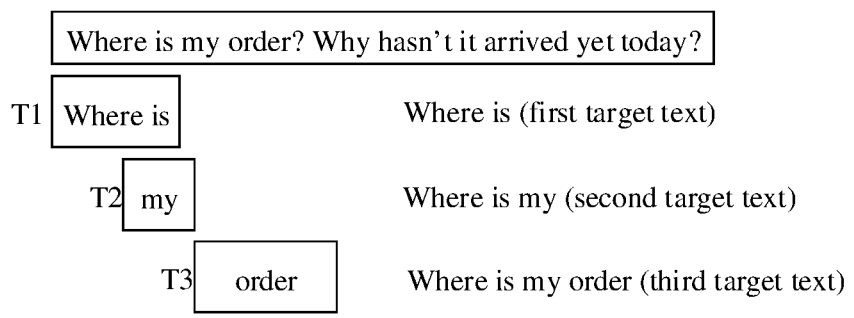
FIG. 3 is a schematic diagram of real-time recognition integration according to an embodiment of the disclosure.

Exemplarily, FIG. 3 is a schematic diagram of real-time recognition integration according to an embodiment of the disclosure. As shown in FIG. 3, real-time texts determined by the continuous ASR module 101 at moments T1, T2, and T3 are "where is", "my" and "order", respectively. The continuous ASR module 101 performs real-time recognition integration at each moment. Real-time recognition integration is not required at the moment T1. That is, the real-time text "where is" corresponding to the moment T1 is a target text corresponding to the moment T1. For the moment T2, real-time recognition integration is performed on the target text "where is" corresponding to the moment T1 and the real-time text "my" corresponding to the moment T2, to obtain a target text "where is my" corresponding to the moment T2. Similarly, a target text corresponding to the moment T3 is "where is my order". Furthermore, the intention prediction module 102 may predict a user intention according to the target text "where is my" corresponding to the moment T2, thereby determining that the second predicted intention is "logistics query".

Furthermore, in the embodiment of the disclosure, after the terminal determines the second target text corresponding to the second moment and the second predicted intention, the determined first predicted intention and second predicted intention may be used for determining whether the terminal satisfies a response condition.

In 1004, whether a preset response condition is satisfied is determined according to the first predicted intention and the second predicted intention.

In the embodiment of the disclosure, after determining the first predicted intention corresponding to the first moment and the second predicted intention corresponding to the second moment, the terminal may determine whether the terminal satisfies the preset response condition according to the determined first predicted intention and second predicted intention.

It is to be noted that, in the embodiment of the disclosure, by continuous ASR, the first predicted intention may be a predicted intention determined according to the target text corresponding to the previous moment, and the second predicted intention may be a predicted intention corresponding to the successive present moment after the previous moment. The determined first predicted intention and second predicted intention are stored in the intention management module. The intention management module determines whether the preset response condition is satisfied according to the determined first predicted intention and second predicted intention. Specifically, it is determined that the preset response condition is satisfied when the first predicted intention is consistent with the second predicted intention. It is determined that the preset response condition is not satisfied when the first predicted intention is inconsistent with the second predicted intention.

Exemplarily, after it is determined that the first predicted intention corresponding to the first moment is "logistics query", ASR processing continues to be performed, and intention prediction is performed on obtained speech information. When the second predicted intention corresponding to the second moment is also "logistics query", the first predicted intention is consistent with the second predicted intention, namely the intention management module determines that the preset response condition is satisfied presently. When the second predicted intention corresponding to the second moment is "abnormal receipt", the first predicted intention is inconsistent with the second predicted intention. In such case, the intention management module determines that the preset response condition is not satisfied presently.

Furthermore, in the embodiment of the disclosure, after determining whether the preset response condition is satisfied according to the first predicted intention and the second predicted intention, the terminal may further determine whether to respond according to a determination result.

In 1005, responding is performed based on the answer to be pushed in response to determining that the preset response condition is satisfied.

In the embodiment of the disclosure, after determining whether the preset response condition is satisfied according to the determined first predicted intention and second predicted intention, the terminal performs responding based on the answer to be pushed that is temporarily stored in response to determining that the preset response condition is satisfied.

It is to be noted that, in the embodiment of the disclosure, if it is determined that the preset response condition is satisfied presently, the intention management module sends a determination result indicating that the preset response condition is satisfied presently to the answer decision module. In such case, the answer decision module sends the answer to be pushed that is temporarily stored, so as to implement responding. That is, responding is performed with the answer to be pushed that is determined in advance based on the first predicted intention.

Specifically, when the first predicted intention is consistent with the second predicted intention, namely it is determined that the preset response condition is satisfied presently, it is unnecessary to perform answer assembly again according to the determined second predicted intention, and instead, responding is performed directly according to the answer to be pushed that is temporarily stored, i.e., the first answer determined according to the first predicted intention. That is, if it is determined that the preset response condition is satisfied, it indicates that the first predicted intention determined according to the first target text is a clear user intention, and the first answer corresponding to the first predicted intention is information desired by the user actually. In such case, responding is performed based on the first answer assembled in advance, i.e., the answer to be pushed that is temporarily stored in the answer decision module.

Figure 4:
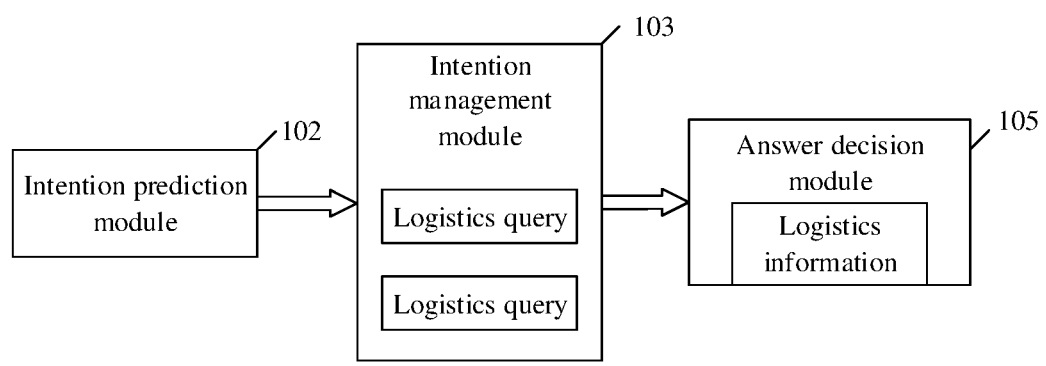
FIG. 4 is a schematic diagram illustrating a situation in which a preset response condition is satisfied according to an embodiment of the disclosure.

Exemplarily, FIG. 4 is a schematic diagram illustrating a situation in which a preset response condition is satisfied according to an embodiment of the disclosure. As shown in FIG. 4, when the first predicted intention predicted by the intention prediction module 102 is "logistics query", the predicted intention "logistics query" is stored in the intention management module 103. The first answer determined by the answer assembly module according to the first predicted intention is "logistics information". "Logistics information" is stored in the answer decision module 105 as the answer to be pushed. When the determined second predicted intention is also "logistics query", the intention management module 103 determines that the first predicted intention is consistent with the second predicted intention, and it indicates that the preset response condition is satisfied presently. In other words, the user intention is clear. The practical intention of the user is "logistics query", and desired information is "logistics information". In such case, it is no more necessary to determine a second answer that is the same as the first answer "logistics information" according to the second predicted intention "logistics query", and the intention management module 103 sends a determination result indicating that the preset response condition is satisfied presently to the answer decision module 105, thereby implementing responding with the answer to be pushed that is stored in advance in the answer decision module 105, i.e., the first answer "logistics information".

It is to be noted that, in the embodiment of the disclosure, it is necessary to implement speech responding based on a TTS technology when responding is performed according to the answer to be pushed. Specifically, text information corresponding to the answer to be pushed is converted into a target speech by means of the TTS technology, and then the target speech is played through a device such as a speaker, thereby implementing speech responding to the obtained speech information.

Furthermore, after performing responding with the answer to be pushed in response to determining that the preset response condition is satisfied, the terminal performs ASR processing again at a next moment through the continuous ASR module, thereby continuing to implement responding.

By continuous recognition, a respective target text corresponding to each speech information collected at each moment T may be determined at the moment by means of ASR, and a predicted intention corresponding to the moment is further determined. When predicted intentions corresponding to a previous moment and the present moment are the same, a response is given to the speech information input by the user immediately, so as to implement speech responding. Since speech information input at a next moment may correspond to another intention of the user, i.e., a new intention different from the user intention to which a response has been given at the previous moment, after the speech response module responds to the present user intention, the continuous ASR module may continue to perform ASR processing on the speech information input at the next moment to determine a target text corresponding to the next moment, and further predict the new intention corresponding to the speech information input at the next moment, to further implement responding. That is, the terminal performs continuous intention prediction by real-time ASR processing, and every time when recognizing a clear user intention, responds immediately according to an answer to be pushed and continues to perform prediction and responding for a next intention.

Exemplarily, after the terminal determines that a predicted intention corresponding to speech information "where is my television" is "logistics query" and responds with an answer to be pushed "logistics information", the speech response system does not end this responding process, but continues to perform ASR processing on input speech information. When a target text determined by the continuous ASR module at a next moment is "there is a storm coming these two days, please deliver it to me as soon as possible", a new predicted intention determined by the intention prediction module according to the target text is "expediting delivery", which is a new intention different from the intention "logistics query" to which a response has been given. In such case, responding is performed for the new intention "expediting delivery".

Figure 5:
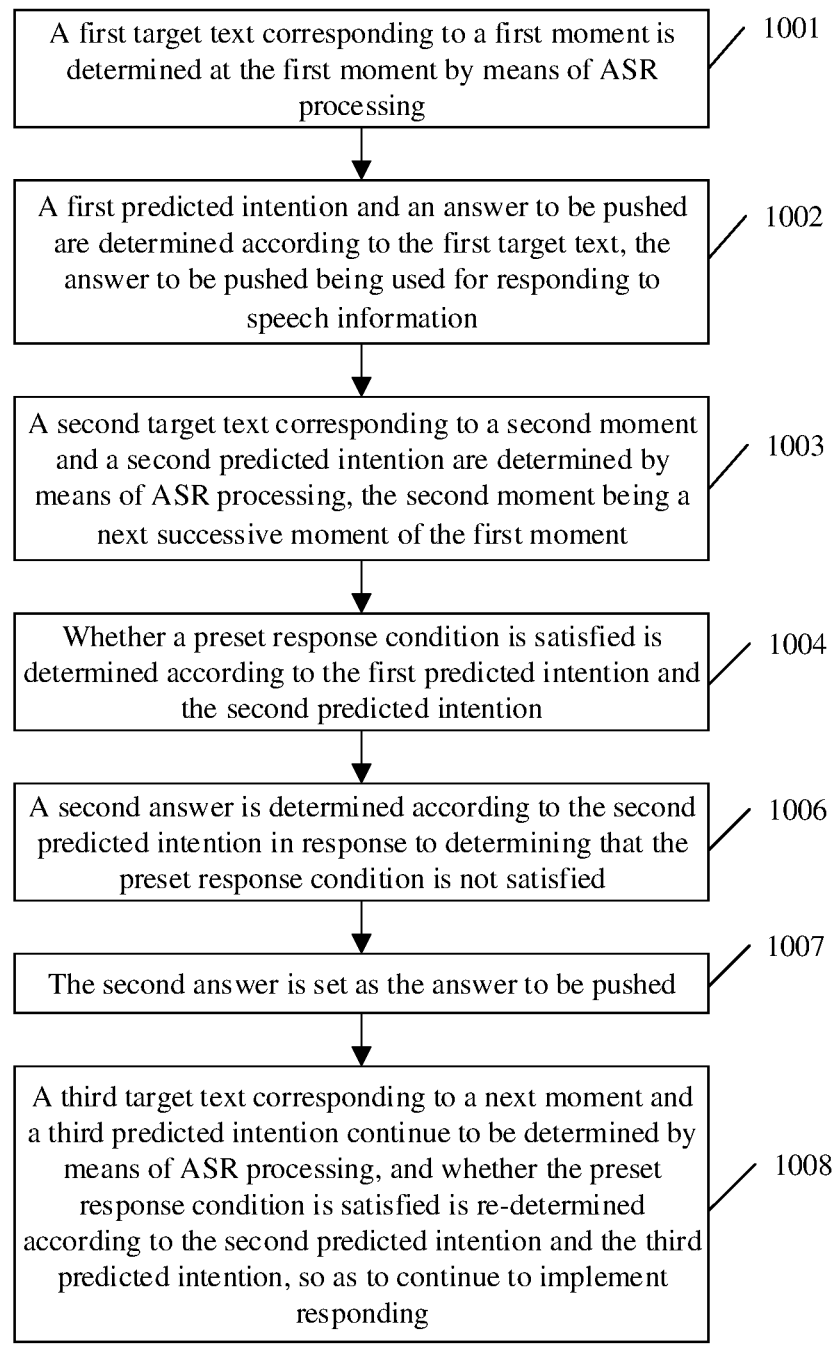
FIG. 5 is a second implementation flowchart of a response method according to an embodiment of the disclosure.

Based on the above-mentioned embodiment, FIG. 5 is a second implementation flowchart of a response method according to another embodiment of the disclosure. As shown in FIG. 5, after the terminal determines whether the preset response condition is satisfied according to the determined first predicted intention and second predicted intention, namely after the operation 1004, the response method for the terminal may further include the following operations.

In 1006, a second answer is determined according to the second predicted intention in response to determining that the preset response condition is not satisfied.

In the embodiment of the disclosure, after determining whether the preset response condition is satisfied according to the determined first predicted intention and second predicted intention, the terminal may further determine the second answer according to the second predicted intention in response to determining that the preset response condition is not satisfied.

It is to be noted that, in the embodiment of the disclosure, if it is determined that the preset response condition is not satisfied presently, namely the first predicted intention obtained according to the obtained first target text is not correct, it indicates that a user intention obtained by predicting a question to be asked by the user before the user finishes speaking is not a question that the user actually wants to ask, and furthermore, the answer to be pushed that is determined according to the first predicted intention is not a correct answer, i.e., not information desired by the user actually. In such case, the answer assembly module needs to assemble an answer again according to the determined second predicted intention, to determine the second answer corresponding to the second predicted intention.

Figure 6:
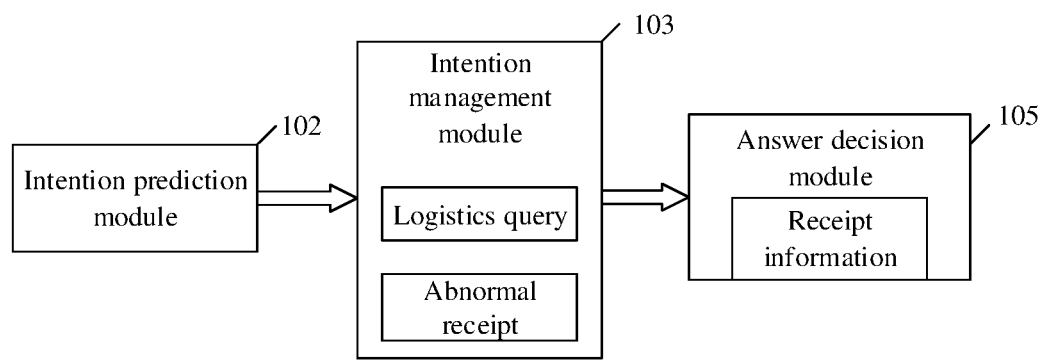
FIG. 6 is a schematic diagram illustrating a situation in which a preset response condition is not satisfied according to an embodiment of the disclosure.

Exemplarily, FIG. 6 is a schematic diagram illustrating a situation in which a preset response condition is not satisfied according to an embodiment of the disclosure. As shown in FIG. 6, when the intention prediction module 102 predicts that the first predicted intention corresponding to the first moment is "logistics query", and the answer to be pushed that is determined according to the first predicted intention is "logistics information", if the second predicted intention determined at the second moment is "abnormal receipt", the intention management module 103 determines that the first predicted intention is inconsistent with the second predicted intention, and further determines that the preset response condition is not satisfied presently, which indicates that a real intention of the user is to query abnormal receipt information rather than logistics and the answer to be pushed "logistics information" that is stored in the answer decision module 105 is also wrong. In such case, the intention management module 103 sends a determination result indicating that the preset response condition is not satisfied presently to the answer decision module 105. The answer decision module 105 discards the answer to be pushed "logistics information". The answer assembly module assembles the answer again according to the determined second predicted intention, i.e., "abnormal receipt", to determine a second answer "receipt information" corresponding to the predicted intention "abnormal receipt", and stores the second answer "receipt information" in the answer decision module 105 as an answer to be pushed.

Furthermore, after it is determined according to the first predicted intention and the second predicted intention that the preset response condition is not satisfied, and the terminal determines the second answer according to the second predicted intention, it is necessary to further determine an answer to be pushed corresponding to the second moment.

In 1007, the second answer is set as the answer to be pushed.

In the embodiment of the disclosure, the terminal sets the second answer as the answer to be pushed after determining according to the first predicted intention and the second predicted intention that the preset response condition is not satisfied and determining the second answer according to the second predicted intention.

It is to be noted that, in the embodiment of the disclosure, the second target text obtained at the second moment includes more useful information, and the second predicted intention determined according to the second target text is more probably a clear user intention, and is more accurate than the first predicted intention. Therefore, after the second answer is determined according to the second predicted intention, the second answer determined according to the second predicted intention is more probably the information desired by the user actually. In such case, the answer to be pushed is replaced with the second answer determined according to the second predicted intention.

Exemplarily, when the second predicted intention determined at the second moment is "abnormal receipt", it indicates that a real intention of the user is probably to query the abnormal receipt of the order rather than the first predicted intention "logistics query", namely the information desired by the user is the receipt information of the order. In such case, the answer assembly module determines a second answer as "receipt information" according to the determined second predicted intention "abnormal receipt", and stores "receipt information" in the answer decision module as the answer to be pushed to replace the answer to be pushed "logistics information" determined at the previous moment according to the first predicted intention.

Furthermore, after the second answer is set as the answer to be pushed, it is necessary to continue to determine a predicted intention corresponding to a next moment by means of ASR processing, thereby determining whether the preset response condition is satisfied according to the second predicted intention and the predicted intention corresponding to the next successive moment of the second moment.

In 1008, a third target text corresponding to a third moment and a third predicted intention continue to be determined by means of the ASR processing, and whether the preset response condition is satisfied is re-determined according to the second predicted intention and the third predicted intention, to continue to implement responding.

In the embodiment of the disclosure, after setting the second answer as the answer to be pushed, the terminal may continue to perform ASR processing to determine the third target text corresponding to the third moment and the third predicted intention, and re-determine whether the preset response condition is satisfied according to the second predicted intention and the third predicted intention, thereby further implementing responding.

It is to be noted that, in the embodiment of the disclosure, if the intention management module determines that the first predicted intention is inconsistent with the second predicted intention, it indicates that the answer to be pushed determined by performing answer assembly in advance according to the first predicted intention is not correct. In such case, the answer assembly module assembles the answer again according to the second predicted intention, and stores the second answer determined according to the second predicted intention temporarily in the answer decision module to replace the answer to be pushed. In order to further make clear the user intention, the terminal continues to obtain the third target text corresponding to the next moment through the continuous ASR module and determine the third predicted intention through the intention prediction module. Then, the intention management module re-determines whether the preset response condition is satisfied according to the second predicted intention and the third predicted intention, thereby further implementing responding.

It is to be noted that, in the embodiment of the disclosure, the intention prediction module determines the third predicted intention corresponding to the next moment by continuous intention prediction. When the intention management module determines that the third predicted intention is consistent with the second predicted intention, it indicates that the preset response condition is satisfied at the next moment. Therefore, responding is performed with the answer to be pushed, i.e., the second answer.

The embodiment of the disclosure provides a response method. The terminal determines, at the first moment, the first target text corresponding to the first moment by means of ASR processing, determines the first predicted intention and the answer to be pushed according to the first target text, the answer to be pushed being used for responding to speech information, continues to determine the second target text corresponding to the second moment and the second predicted intention by means of the ASR processing, the second moment being a next successive moment of the first moment, determines whether the preset response condition is satisfied according to the first predicted intention and the second predicted intention, and performs responding with the answer to be pushed in response to determining that the preset response condition is satisfied. That is, in the embodiment of the disclosure, the terminal performs continuous intention prediction on the input speech information by means of real-time ASR processing, assembles an answer in advance, stores the answer temporarily, and pushes the answer in response to determining that the preset response condition is satisfied presently so as to implement responding. Not only is the responding efficiency improved, but also the defect of intention loss is overcome, the responding accuracy is further improved, and the terminal is smarter.

Based on the above-mentioned embodiments, in another embodiment of the disclosure, a method for the terminal to determine the first predicted intention and the answer to be pushed according to the first target text may include the following operations.

In 201, predicted intention matching is performed on the first target text through a preset prediction model to determine N predicted intentions corresponding to the first target text. The preset prediction model is a model established based on deep learning, and N being an integer greater than 1.

In the embodiment of the disclosure, after determining the first target text corresponding to the first speech information, the terminal performs predicted intention matching on the determined first target text through the preset prediction model, thereby determining N predicted intentions corresponding to the first target text. The preset prediction model is a model established based on the deep learning. N is an integer greater than 1.

It is to be noted that, in the embodiment of the disclosure, when the terminal performs predicted intention matching on the first target text through the preset prediction model, intention prediction is performed when the user speaks, namely the intention is predicted according to a respective target text determined at each moment. At this time, complete speech information corresponding to the user intention has not been obtained, complete target text information cannot be determined, and the respective target text obtained at each moment is partial target text information. Therefore, the intention prediction module may predict multiple user intentions when performing intention prediction on the target text, i.e., a partial target text, using the preset prediction model.

Exemplarily, when the first target text is "my order", the user input, i.e., the complete target text information, may be "what is my order status", or "what is my order number". Therefore, when predicted intention matching is performed on the target text "my order" through the preset prediction model, an obtained predicted intention may be "logistics query", or "tracking number query", and multiple predicted intentions may be matched.

Furthermore, after the N predicted intentions corresponding to the first target text are matched through the preset prediction model, an only predicted intention may further be determined from the N predicted intentions.

In 202, the first predicted intention is determined from the N predicted intentions.

In the embodiment of the disclosure, after matching the first target text through the preset prediction model and determining the N predicted intentions corresponding to the first target text, the terminal may further determine the first predicted intention from the N predicted intentions.

It is to be noted that, in the embodiment of the disclosure, when performing predicted intention matching on the first target text through the preset prediction model, the terminal may not only determine the N predicted intentions corresponding to the first target text, but also obtain weight values corresponding to the N predicted intentions. After determining the N predicted intentions corresponding to the first target text, the terminal needs to determine the predicted intention with highest accuracy, i.e., the first predicted intention, from the multiple predicted intentions. Optionally, the accuracy may be determined according to a weight corresponding to the predicted intention. If the weight value is greater, the accuracy is higher.

Furthermore, after the terminal determines the first predicted intention from the N predicted intentions, the first predicted intention may be used for determining the answer to be pushed.

In 203, a first answer is determined according to the first predicted intention, and the first answer is determined as the answer to be pushed.

In the embodiment of the disclosure, after determining the first predicted intention from the N predicted intentions, the terminal may further determine the first answer according to the first predicted intention, and determine the first answer as the answer to be pushed.

It is to be noted that, in the embodiment of the disclosure, after determining the first predicted intention, the terminal may assembles an answer in advance according to the first predicted intention to determine the answer to be pushed. Specifically, feature information corresponding to the first predicted intention is extracted. Optionally, the feature information may be a keyword. Then, all information corresponding to the keyword is obtained, and answer assembly is performed on all the information corresponding to the keyword through a preset algorithm, to obtain the first answer. The terminal sets the first answer as the answer to be pushed, and stores the first answer in the answer decision module.

Exemplarily, after determining that the first predicted intention is "logistics query", the terminal extracts feature information corresponding to the predicted intention, e.g., a keyword "logistics". Then, the terminal obtains information, corresponding to the keyword "logistics", about warehousing and delivery of a parcel of the user in each place and traveling of a transport vehicle, assembles all the information through a preset algorithm to obtain a complete logistics information list, and stores the complete logistics information list temporarily as an answer to be pushed.

Furthermore, based on the above-mentioned embodiments, the method for the terminal to determine the first predicted intention from the N predicted intentions may include the following operations.

In 202a, N weights corresponding to the N predicted intentions are obtained. Each of the N predicted intentions corresponds to a respective one of the N weights.

In 202b, the predicted intention corresponding to the weight with a maximum numerical value in the N weights is determined as the first predicted intention.

In the embodiment of the disclosure, after determining the N predicted intentions corresponding to the first target text, the terminal further obtains N weights corresponding to the N predicted intentions, and determines the predicted intention corresponding to the weight with a maximum numerical value in the N weights as the first predicted intention.

It is to be noted that, in the embodiment of the disclosure, when performing predicted intention matching on the first target text through the preset prediction model, the terminal may not only determine the N predicted intentions corresponding to the first target text, but also obtain the weight values corresponding to the N predicted intentions. The weight value reflects accuracy of the predicted intention. Furthermore, since an only predicted intention corresponding to the first target text, i.e., a clear user intention with a relatively high probability, needs to be determined from the obtained N predicted intentions, it is necessary to compare the N weight values corresponding to the N predicted intentions, and determine the predicted intention corresponding to the maximum weight value, i.e., the predicted intention with highest accuracy, as a predicted intention corresponding to the first target text, i.e., the first predicted intention.

For example, the intention prediction model determines multiple predicted intentions such as "logistics query", "tracking number query", and "abnormal receipt" according to the first target text, and simultaneously obtains a weight 0.45 corresponding to "logistics query", a weight 0.3 corresponding to "tracking number query", and a weight 0.25 corresponding to "abnormal receipt". It can be seen that the weight value corresponding to the predicted intention "logistics query" is maximum, and it indicates that the user intention is more probably "logistics query". Therefore, the predicted intention "logistics query" corresponding to the maximum weight value in the multiple predicted intentions corresponding to the first target text "my order" is determined as the first predicted intention.

The embodiment of the disclosure provides a response method. The terminal performs continuous intention prediction on the input speech information by means of real-time ASR processing, assembles an answer in advance, stores the answer temporarily, and pushes the answer in response to determining that the preset response condition is satisfied presently, so as to implement responding. Not only is the responding efficiency improved, but also the defect of intention loss is overcome, the responding accuracy is further improved, and the terminal is smarter.

Based on the above-mentioned embodiments, in another embodiment of the disclosure, a method for the terminal to determine whether the preset response condition is satisfied according to the first predicted intention and the second predicted intention may include the following operations.

In 301, a first weight corresponding to the first predicted intention and a second weight corresponding to the second predicted intention are determined.

In the embodiment of the disclosure, after determining the first predicted intention and the second predicted intention, the terminal may further determine the first weight corresponding to the first predicted intention and the second weight corresponding to the second predicted intention.

It is to be noted that, in the embodiment of the disclosure, when predicted intention matching is performed on the target text through the preset prediction model, a predicted intention corresponding to the target text and a weight value corresponding to the predicted intention may be obtained, and the weight value reflects accuracy of the determined predicted intention. That is, the first weight is a weight value corresponding to the first predicted intention with the highest accuracy and matched at the first moment through the preset prediction model. Correspondingly, the second weight is a weight value corresponding to the second predicted intention with the highest accuracy and matched at the second moment through the preset prediction model.

After the terminal determines the first weight corresponding to the first predicted intention and the second weight corresponding to the second predicted intention, the determined first weight corresponding to the first predicted intention and the second weight corresponding to the second predicted intention may be used for determining whether the preset response condition is satisfied.

In 302, it is determined that the preset response condition is satisfied when the first predicted intention is the same as the second predicted intention and both the first weight and the second weight are greater than a preset weight threshold. The preset weight threshold is used for determining accuracy of the predicted intention.

In the embodiment of the disclosure, after determining the first weight corresponding to the first predicted intention and the second weight corresponding to the second predicted intention, the terminal may determine that the preset response condition is satisfied when the first predicted intention is the same as the second predicted intention and both the first weight and the second weight are greater than the preset weight threshold.

It is to be noted that, in the embodiment of the disclosure, when the first predicted intention is consistent with the second predicted intention, it is not determined that the preset response condition is satisfied, and further, whether the preset response condition is satisfied is determined according to the first weight and the second weight. Specifically, it is determined that the preset response condition is satisfied only in case that the first predicted intention is the same as the second predicted intention and both the first weight and the second weight are greater than the preset weight threshold. The preset weight threshold is a weight value satisfying the preset response condition.

Exemplarily, it is assumed that the preset weight threshold is 0.7. When the first predicted intention corresponding to the first moment is "logistics query", and the second predicted intention corresponding to the second moment is also logistics query", it can be seen that the first predicted intention is consistent with the second predicted intention. However, it may not be determined that the preset response condition is satisfied, and it is necessary to further determine whether the preset response condition is satisfied according to the first weight and the second weight. If the first weight is 0.75, and the second weight is 0.81, the first predicted intention is consistent with the second predicted intention, and both the first weight and the second weight are greater than the preset weight threshold. Therefore, it may be determined that the preset response condition is satisfied.

If at least one of the first weight and the second weight is less than the preset weight threshold, it may be determined that the preset response condition is not satisfied.

The embodiment of the disclosure provides a response method. The terminal performs continuous intention prediction on the input speech information by means of real-time ASR processing, assembles an answer in advance, stores the answer temporarily, and pushes the answer in response to determining that the preset response condition is satisfied presently, so as to implement responding. Not only is the responding efficiency improved, but also the defect of intention loss is overcome, the responding accuracy is further improved, and the terminal is smarter.

Figure 7:
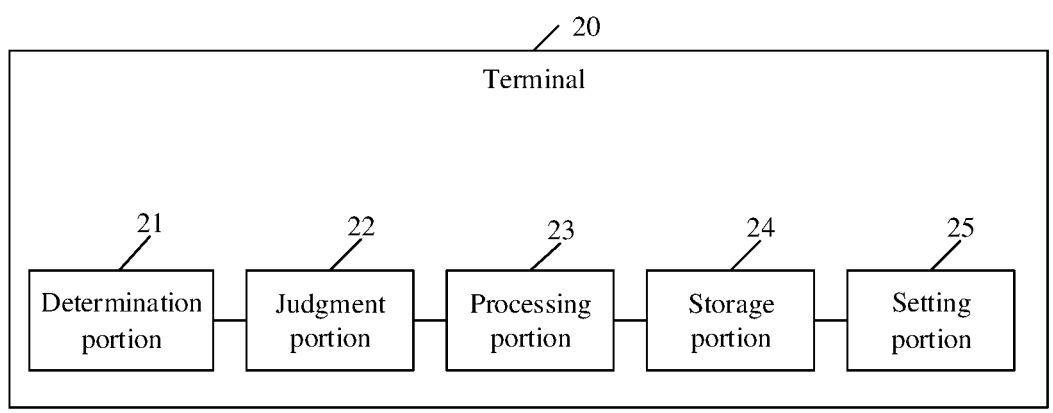
FIG. 7 is a first composition structure diagram of a terminal according to an embodiment of the disclosure.

Based on the above-mentioned embodiments, in another embodiment of the disclosure, a terminal is provided. FIG. 7 is a first composition structure diagram of a terminal according to an embodiment of the disclosure. As shown in FIG. 7, the terminal 20 disclosed in the embodiment of the disclosure includes a determination portion 21, a judgment portion 22, a processing portion 23, a storage portion 24, and a setting portion 25.

The determination portion 21 is configured to: determine, at a first moment, a first target text corresponding to the first moment by means of ASR processing; determine a first predicted intention and an answer to be pushed according to the first target text, the answer to be pushed being used for responding to speech information; and continue to determine a second target text corresponding to a second moment and a second predicted intention by means of the ASR processing, the second moment being a next successive moment of the first moment.

The judgment portion 22 is configured to determine whether a preset response condition is satisfied according to the first predicted intention and the second predicted intention.

The processing portion 23 is configured to respond with the answer to be pushed in response to determining that the preset response condition is satisfied.

In the embodiment of the disclosure, the determination portion 21 is specifically configured to obtain first speech information corresponding to the first moment, and perform the ASR processing on the first speech information to convert the first speech information into the first target text.

In the embodiment of the disclosure, the determination portion 21 is further specifically configured to: perform predicted intention matching on the first target text through a preset prediction model to determine N predicted intentions corresponding to the first target text, the preset prediction model being a model established based on deep learning, and N being an integer greater than 1; determine the first predicted intention from the N predicted intentions; and determine a first answer according to the first predicted intention, and determine the first answer as the answer to be pushed.

In the embodiment of the disclosure, the determination portion 21 is further specifically configured to: obtain N weights corresponding to the N predicted intentions, each of the N predicted intentions corresponding to a respective one of the N weights; and determine a predicted intention corresponding to a weight with a maximum numerical value in the N weights as the first predicted intention.

In the embodiment of the disclosure, the determination portion 21 is further specifically configured to: obtain feature information corresponding to the first predicted intention; and determine the first answer according to the feature information and a preset algorithm, the preset algorithm being used for performing answer assembly based on the feature information.

In the embodiment of the disclosure, the storage portion 24 is configured to store the answer to be pushed after the first answer is determined as the answer to be pushed.

In the embodiment of the disclosure, the determination portion 21 is further specifically configured to: obtain second speech information corresponding to the second moment; perform the ASR processing on the second speech information to determine a real-time text corresponding to the second speech information; and determine the second target text according to the first target text and the real-time text.

In the embodiment of the disclosure, the judgment portion 22 is specifically configured to: determine that the preset response condition is satisfied when the first predicted intention is the same as the second predicted intention; and determine that the preset response condition is not satisfied when the first predicted intention is different from the second predicted intention.

In the embodiment of the disclosure, the judgment portion 22 is further specifically configured to: determine a first weight corresponding to the first predicted intention and a second weight corresponding to the second predicted intention; and determine that the preset response condition is satisfied when the first predicted intention is the same as the second predicted intention and both the first weight and the second weight are greater than a preset weight threshold, the preset weight threshold being used for determining accuracy of the predicted intention.

In the embodiment of the disclosure, the determination portion 21 is further configured to, after determining whether the preset response condition is satisfied according to the first predicted intention and the second predicted intention, determine a second answer according to the second predicted intention in response to determining that the preset response condition is not satisfied.

In the embodiment of the disclosure, the setting portion 25 is configured to set the second answer as the answer to be pushed.

In the embodiment of the disclosure, the determination portion 21 is further specifically configured to continue to determine a third target text corresponding to a next moment and a third predicted intention by means of the ASR processing.

In the embodiment of the disclosure, the judgment portion 22 is further configured to re-determine whether the preset response condition is satisfied according to the second predicted intention and the third predicted intention, to continue to implement responding.

In the embodiment of the disclosure, the processing portion 23 is specifically configured to perform TTS processing on the answer to be pushed to determine a target speech, and play the target speech to implement responding.

Figure 8:
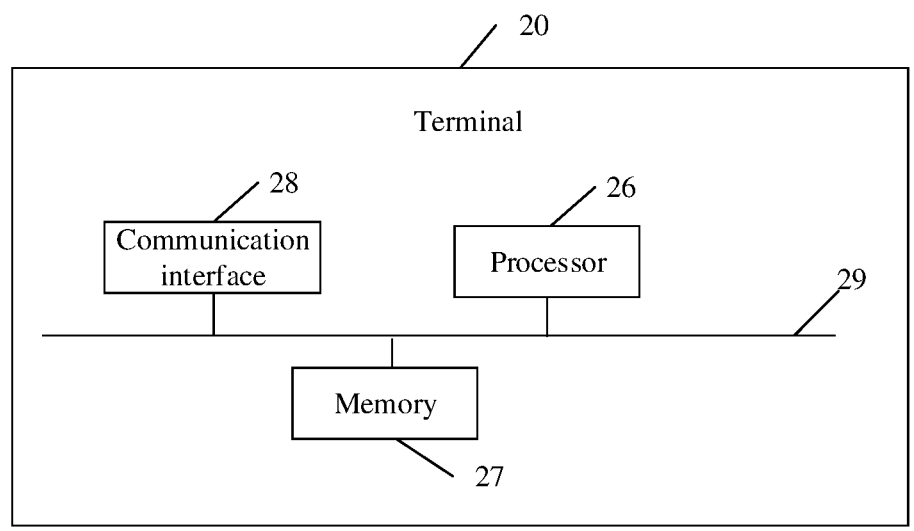
FIG. 8 is a second composition structure diagram of a terminal according to an embodiment of the disclosure.

In the embodiment of the disclosure, FIG. 8 is a second composition structure diagram of a terminal according to an embodiment of the disclosure. As shown in FIG. 8, the terminal 20 disclosed in the embodiment of the disclosure may include a processor 26, and a memory 27 storing an instruction executable by the processor 26. The terminal 20 may further include a communication interface 28, and a bus 29 configured to connect the processor 26, the memory 27, and the communication interface 28.

In the embodiment of the disclosure, the processor 26 may be at least one of an Application Specific Integrated Circuit (ASIC), a Digital Signal Processor (DSP), a Digital Signal Processing Device (DSPD), a Programmable Logic Device (PLD), a Field Programmable Gate Array (FPGA), a Central Processing Unit (CPU), a controller, a microcontroller, and a microprocessor. It can be understood that, for different devices, other electronic components may be used to implement functions of the processor, and no specific limits are made in the embodiment of the disclosure. The terminal 20 may further include the memory 27. The memory 27 may be connected with the processor 26. The memory 27 is configured to store an executable program code. The program code includes a computer operation instruction. The memory 27 may include a high-speed Random Access Memory (RAM), or a non-volatile memory, e.g., at least two disk memories.

In the embodiment of the disclosure, the bus 29 is configured to connect the communication interface 28, the processor 26, and the memory 27, and implement communications between these devices.

In the embodiment of the disclosure, the memory 27 is configured to store an instruction and data.

Furthermore, in the embodiment of the disclosure, the processor 26 is configured to: determine, at a first moment, a first target text corresponding to the first moment by means of ASR processing; determine a first predicted intention and an answer to be pushed according to the first target text, the answer to be pushed being used for responding to speech information; continue to determine a second target text corresponding to a second moment and a second predicted intention by means of the ASR processing, the second moment being a next successive moment of the first moment; determine whether a preset response condition is satisfied according to the first predicted intention and the second predicted intention; and respond with the answer to be pushed in response to determining that the preset response condition is satisfied.

In practical applications, the memory 27 may be a volatile memory such as a RAM, or a non-volatile memory such as a Read-Only Memory (ROM), a flash memory, a Hard Disk Drive (HDD) or a Solid-State Drive (SSD), or a combination of the memories, and configured to provide instructions and data to the processor 26.

In addition, each function module in the embodiment may be integrated into a processing unit. Alternatively, each unit may exist independently. Alternatively, two or more than two units may be integrated into a unit. The integrated unit may be implemented in a hardware form, or in form of a software function module.

When being implemented in form of a software function module and sold or used as an independent product, the integrated unit may be stored in a computer-readable storage medium. Based on such an understanding, the technical solution of the embodiment substantially or parts making contributions to the related art or all or part of the technical solution may be embodied in form of a software product, and the computer software product is stored in a storage medium, including a plurality of instructions for causing a computer device (which may be a personal computer, a server, a network device, or the like) or a processor to execute all or part of the steps of the method in the embodiment. The storage medium includes various media capable of storing program codes such as a U disk, a mobile hard disk, a ROM, a RAM, a magnetic disk, or an optical disk.

The embodiment of the disclosure provides a terminal. The terminal determines, at a first moment, a first target text corresponding to the first moment by means of ASR processing; determines a first predicted intention and an answer to be pushed according to the first target text, the answer to be pushed being used for responding to speech information; continues to determine a second target text corresponding to a second moment and a second predicted intention by means of the ASR processing, the second moment being a next successive moment of the first moment; determines whether a preset response condition is satisfied according to the first predicted intention and the second predicted intention; and responds with the answer to be pushed in response to determining that the preset response condition is satisfied. That is, in the embodiment of the disclosure, the terminal performs continuous intention prediction on the input speech information by means of real-time ASR processing, assembles an answer in advance, stores the answer temporarily, and pushes the answer in response to determining that the preset response condition is satisfied presently to implement responding. Not only is the responding efficiency improved, but also the defect of intention loss is overcome, the responding accuracy is further improved, and the terminal is smarter.

An embodiment of the disclosure provides a computer-readable storage medium having stored therein a computer program which, when being executed by a processor, causes the processor to implement the response method as described above.

Specifically, a program instruction corresponding to the response method in the embodiment may be stored in a storage medium such as an optical disk, a hard disk, or a U disk. When the program instruction corresponding to the response method in the storage medium is read or executed by an electronic device, the following operations are included.

A first target text corresponding to a first moment is determined at the first moment by means of ASR processing.

A first predicted intention and an answer to be pushed are determined according to the first target text, the answer to be pushed being used for responding to speech information.

A second target text corresponding to a second moment and a second predicted intention continue to be determined by means of the ASR processing, the second moment being a next successive moment of the first moment.

Whether a preset response condition is satisfied is determined according to the first predicted intention and the second predicted intention.

Responding is performed with the answer to be pushed in response to determining that the preset response condition is satisfied.

Those skilled in the art should know that the embodiments of the disclosure may be provided as a method, a system, or a computer program product. Therefore, the disclosure may be implemented in a form of a hardware embodiment, a software embodiment, or an embodiment combining software and hardware. Moreover, the disclosure may be implemented in a form of a computer program product implemented on one or more computer-readable storage media (including, but not limited to, a disk memory, an optical memory, etc.) including computer-readable program codes.

The disclosure is described with reference to implementation flowcharts and/or block diagrams of the method, device (system), and computer program product according to the embodiments of the disclosure. It is to be understood that each flow and/or block in the flowcharts and/or the block diagrams and combinations of the flows and/or blocks in the implementation flowcharts and/or the block diagrams may be implemented by computer program instructions. These computer program instructions may be provided for a general-purpose computer, a special-purpose computer, an embedded processor, or a processor of another programmable data processing device to generate a machine, so that a device for realizing a function specified in one flow or multiple flows in the implementation flowcharts and/or one block or multiple blocks in the block diagrams is generated by the instructions executed through the computer or the processor of the other programmable data processing device.

Alternatively, these computer program instructions may be stored in a computer-readable memory capable of guiding the computer or the other programmable data processing device to work in a specific manner, so that a product including an instruction device may be generated by the instructions stored in the computer-readable memory, the instruction device realizing the function specified in one flow or multiple flows in the implementation flowcharts and/or one block or multiple blocks in the block diagrams.

Alternatively, these computer program instructions may be loaded onto the computer or the other programmable data processing device, so that a series of operating steps are executed on the computer or the other programmable data processing device to generate processing implemented by the computer, and steps for realizing the function specified in one flow or multiple flows in the implementation flowcharts and/or one block or multiple blocks in the block diagrams are provided by the instructions executed on the computer or the other programmable data processing device.

Described above are merely preferred embodiments of the disclosure and not intended to limit the scope of protection of the disclosure.

The invention claimed is:

1. A speech response method carried out by a terminal provided with a speech response system, the method comprising:

obtaining, by the terminal at a first moment, first speech information communicated from a user;

determining a first target text corresponding to the first speech information obtained at the first moment by means of Automatic Speech Recognition (ASR) processing;

determining a first predicted intention and an answer to be pushed according to the first target text, the answer to be pushed being used for responding to the first speech information;

determining a second target text corresponding to a second moment and a second predicted intention by means of the ASR processing, the second moment being a next successive moment of the first moment;

determining whether the first predicted intention is the same as the second predicted intention;

outputting the answer to be pushed to the user to implement speech response in response to determining that the first predicted intention is the same as the second predicted intention, and performing the ASR processing again at a next moment of the second moment after outputting the speech response, to continue to implement a next round of speech response processing;

determining a second answer according to the second predicted intention in response to determining that the first predicted intention is different from the second predicted intention, and setting the second answer as the answer to be pushed;

determining a third target text corresponding to the next moment of the second moment and a third predicted intention by means of the ASR processing; and determining whether the second predicted intention is the same as the third predicted intention, to continue to implement the speech response.

2. The method of claim 1, wherein determining the first target text corresponding to the first speech information obtained at the first moment by means of the ASR processing comprises:
  performing the ASR processing on the first speech information to convert the first speech information into the first target text.

3. The method of claim 1, wherein determining the first predicted intention and the answer to be pushed according to the first target text comprises:
  performing predicted intention matching on the first target text using a preset prediction model, to determine N predicted intentions corresponding to the first target text, the preset prediction model being a model established based on deep learning, and N being an integer greater than 1;
  determining the first predicted intention from the N predicted intentions; and
  determining a first answer according to the first predicted intention, and determining the first answer as the answer to be pushed.

4. The method of claim 3, wherein determining the first predicted intention from the N predicted intentions comprises:
  obtaining N weights corresponding to the N predicted intentions, each of the N predicted intentions corresponding to a respective one of the N weights; and
  determining a predicted intention corresponding to a weight with a maximum numerical value in the N weights as the first predicted intention.

5. The method of claim 3, wherein determining the first answer according to the first predicted intention comprises:
  obtaining feature information corresponding to the first predicted intention; and
  determining the first answer according to the feature information and a preset algorithm, the preset algorithm being used for assembling answer based on the feature information.

6. The method of claim 1, wherein determining the second target text corresponding to the second moment comprises:
  obtaining second speech information corresponding to the second moment;
  performing the ASR processing on the second speech information to determine a real-time text corresponding to the second speech information; and
  determining the second target text according to the first target text and the real-time text.

7. The method of claim 1, wherein outputting the answer to be pushed comprises:
  performing Text-To-Speech (TTS) processing on the answer to be pushed to determine a target speech; and
  playing the target speech.

8. A terminal, comprising:
  a processor; an audio collection component; a speaker; and a memory storing an instruction executable by the processor,
  wherein the processor is configured to execute the instruction to:
  control the audio collection component to obtain, at a first moment, first speech information communicated from a user;
  determine a first target text corresponding to the first speech information obtained at the first moment by means of Automatic Speech Recognition (ASR) processing; determine a first predicted intention and an answer to be pushed according to the first target text, the answer to be pushed being used for responding to the first speech information; and determine a second target text corresponding to a second moment and a second predicted intention by means of the ASR processing, the second moment being a next successive moment of the first moment;
  determine whether the first predicted intention is the same as the second predicted intention;
  control the speaker to output the answer to be pushed to the user to implement speech response in response to determining that the first predicted intention is the same as the second predicted intention, and perform the ASR processing again at a next moment of the second moment after outputting the speech response, to continue to implement a next round of speech response processing;
  determine a second answer according to the second predicted intention in response to determining that the first predicted intention is different from the second predicted intention, and set the second answer as the answer to be pushed; determine a third target text corresponding to the next moment of the second moment and a third predicted intention by means of the ASR processing; and
  determine whether the second predicted intention is the same as the third predicted intention, to continue to implement the speech response.

9. The terminal of claim 8, wherein the processor is further configured to:
  perform predicted intention matching on the first target text using a preset prediction model, to determine N predicted intentions corresponding to the first target text, the preset prediction model being a model established based on deep learning, and N being an integer greater than 1; determine the first predicted intention from the N predicted intentions; and determine a first answer according to the first predicted intention, and determine the first answer as the answer to be pushed.

10. The terminal of claim 9, wherein the processor is further configured to:
  obtain N weights corresponding to the N predicted intentions, each of the N predicted intentions corresponding to a respective one of the N weights; and determine a predicted intention corresponding to a weight with a maximum numerical value in the N weights as the first predicted intention.

11. A non-transitory computer-readable storage medium having stored therein a program applied to a terminal, the program, when executed by a processor of the terminal, causes the processor to implement operations comprising:
  obtaining, at a first moment, first speech information communicated from a user;
  determining a first target text corresponding to the first speech information obtained at the first moment by means of Automatic Speech Recognition (ASR) processing;
  determining a first predicted intention and an answer to be pushed according to the first target text, the answer to be pushed being used for responding to the first speech information;
  determining a second target text corresponding to a second moment and a second predicted intention by means of the ASR processing, the second moment being a next successive moment of the first moment;
  determining whether the first predicted intention is the same as the second predicted intention;
  outputting the answer to be pushed to the user to implement speech response in response to determining that the first predicted intention is the same as the second predicted intention, and performing the ASR processing again at a next moment of the second moment after outputting the speech response, to continue to implement a next round of speech response processing;

determining a second answer according to the second predicted intention in response to determining that the first predicted intention is different from the second predicted intention, and setting the second answer as the answer to be pushed;

determining a third target text corresponding to the next moment of the second moment and a third predicted intention by means of the ASR processing; and determining whether the second predicted intention is the same as the third predicted intention, to continue to implement the speech response.

12. The non-transitory computer-readable storage medium of claim 11, wherein determining the first target text corresponding to the first speech information obtained at the first moment by means of the ASR processing comprises:

performing the ASR processing on the first speech information to convert the first speech information into the first target text.

13. The non-transitory computer-readable storage medium of claim 11, wherein determining the first predicted intention and the answer to be pushed according to the first target text comprises:

performing predicted intention matching on the first target text using a preset prediction model, to determine N predicted intentions corresponding to the first target text, the preset prediction model being a model established based on deep learning, and N being an integer greater than 1;

determining the first predicted intention from the N predicted intentions; and determining a first answer according to the first predicted intention, and determining the first answer as the answer to be pushed.

14. The non-transitory computer-readable storage medium of claim 13, wherein determining the first predicted intention from the N predicted intentions comprises:

obtaining N weights corresponding to the N predicted intentions, each of the N predicted intentions corresponding to a respective one of the N weights; and determining a predicted intention corresponding to a weight with a maximum numerical value in the N weights as the first predicted intention.

* * * * *